(12) United States Patent
Scott

(10) Patent No.: US 8,657,548 B2
(45) Date of Patent: Feb. 25, 2014

(54) FASTENER FOR INSULATION

(75) Inventor: Lachlan James Scott, Victoria (AU)

(73) Assignee: ITW Construction Systems Australia Pty Ltd, Victoria (AU)

( * ) Notice: Subject to any disclaimer, the term of this patent is extended or adjusted under 35 U.S.C. 154(b) by 183 days.

(21) Appl. No.: 13/130,342

(22) PCT Filed: Nov. 24, 2009

(86) PCT No.: PCT/IB2009/055322
§ 371 (c)(1),
(2), (4) Date: May 20, 2011

(87) PCT Pub. No.: WO2010/061337
PCT Pub. Date: Jun. 3, 2010

(65) Prior Publication Data
US 2011/0222987 A1    Sep. 15, 2011

(30) Foreign Application Priority Data

Nov. 25, 2008  (AU) ................................ 2008906095

(51) Int. Cl.
*F16B 15/00*    (2006.01)
(52) U.S. Cl.
USPC ........................................... 411/441; 411/533
(58) Field of Classification Search
USPC ........................ 411/368, 369, 533, 542, 441
See application file for complete search history.

(56) References Cited

U.S. PATENT DOCUMENTS

| | | | | |
|---|---|---|---|---|
| 2,968,984 | A | * | 1/1961 | De Caro .......................... 411/441 |
| 4,630,984 | A | * | 12/1986 | Reinwall et al. .............. 411/368 |
| 4,708,552 | A | * | 11/1987 | Bustos et al. ................. 411/80.1 |
| 4,884,932 | A | * | 12/1989 | Meyer ............................ 411/373 |

(Continued)

FOREIGN PATENT DOCUMENTS

| | | |
|---|---|---|
| CN | 1101886 C | 7/1995 |
| DE | 3638234 A1 | 5/1988 |

(Continued)

OTHER PUBLICATIONS

ISR for International Application No. PCT/IB2009/055322 dated May 6, 2010.

*Primary Examiner* — Gary Estremsky
(74) *Attorney, Agent, or Firm* — Lowe Hauptman & Ham LLP

(57) ABSTRACT

A fastener for use in fastening insulation to a substrate, comprising a fastener body having a head for engagement with an outer face of the insulation, a tubular stem extending inwardly from the head for penetration through the insulation into engagement with the substrate, the stem having a pointed tip portion remote from the head for penetration of the insulation and the stem being hollow to receive a fastening pin having a pointed end fully enclosed within the stem adjacent the tip, the interior of the stem being adapted to receive a fastener guide of a fastening tool operative to drive the pin into the substrate by means of a driving piston propelled along the fastener guide by gas pressure on firing of the tool, the fastener being mounted to the fastener guide prior to penetration of the insulation whereby penetration of the insulation by the stem occurs by manual pressure applied by an operator to the tool prior to firing of the tool to drive the pin into the substrate, the external surface of the stem including an array of fins extending generally axially of the stem to ensure uniform displacement of the insulation material during penetration.

21 Claims, 5 Drawing Sheets

(56) References Cited

U.S. PATENT DOCUMENTS

| | | | |
|---|---|---|---|
| 4,932,819 A | | 6/1990 | Almeras |
| 5,267,423 A | * | 12/1993 | Giannuzzi .................. 52/410 |
| 5,611,474 A | | 3/1997 | Schmidle et al. |
| 5,626,451 A | * | 5/1997 | Seibert .................. 411/533 |
| 5,632,585 A | * | 5/1997 | Kluser .................. 411/441 |
| 5,688,092 A | * | 11/1997 | Olvera et al. .............. 411/533 |
| 5,833,420 A | | 11/1998 | Schmidle et al. |
| 6,308,483 B1 | * | 10/2001 | Romine .................. 52/410 |
| 6,565,303 B1 | * | 5/2003 | Riccitelli et al. .............. 411/533 |
| 6,709,214 B1 | * | 3/2004 | Angehrn .................. 411/533 |

FOREIGN PATENT DOCUMENTS

| | | |
|---|---|---|
| EP | 602313 B1 | 1/1996 |
| GB | 2202024 A | 9/1988 |
| WO | 2008034167 A1 | 3/2008 |

* cited by examiner

FASTENER FOR INSULATION

RELATED APPLICATIONS

The present application is national phase of PCT/IB2009/055322 filed Nov. 24, 2009, and claims priority from Australian Application Number 2008906095 filed Nov. 25, 2008.

The present invention relates to fasteners for applying insulation to a substrate.

Insulation (thermal or acoustic) for use in building construction can be applied to an underlying substrate in a variety of ways determined by such factors as the particular usage, the type of insulation, and the type of substrate. Current practice in commercial building construction is for insulation batts or panels to be applied to a hard substrate such as a concrete wall panel or at the underside of a floor slab by means of purpose-designed fasteners using a powder actuated (p.a.) tool to drive a pin of the fastener into the hard substrate. The insulation is of various types and densities, including polystyrene (expanded and extruded), polyester, fibreglass, and mineral wool. P.a. tools use the power of an explosive charge which is sufficient to drive a fastener pin into a hard substrate such as a concrete structure or a steel beam. Current fasteners for applying insulation using a p.a. tool incorporate a fastener pin which is of a size to withstand the high forces generated by conventional p.a. tools. This compromises the overall design of the fastener and in practice it can be quite difficult to push the fastener through batts of medium and hard density prior to firing the tool in order to drive the fastener pin into the substrate to retain the fastener thereto. Moreover, the use of the p.a. tool itself in this fastening situation gives rise to operational difficulties. P.a. tools are subject to quite substantial recoil on firing and particularly in a situation when an operator is working from below when fixing batts to the underside of a ceiling, it can be very tiring for the operator to absorb the recoil.

The present invention relates to an insulation fastener designed for use with tools for driving smaller sized fastener pins into a substrate, such as gas or air tools or p.a. tools modified for that purpose.

According to the present invention there is provided a fastener for use in fastening insulation to a substrate, comprising a fastener body having a head for engagement with an outer face of the insulation, a tubular stem extending inwardly from the head for penetration through the insulation into engagement with the substrate, the stem having a pointed tip portion remote from the head for penetration of the insulation and the stem being hollow to receive a fastening pin having a pointed end fully enclosed within the stem adjacent the tip, the interior of the stem being adapted to receive a fastener guide of a fastening tool operative to drive the pin into the substrate by means of a driving piston propelled along the fastener guide by gas pressure on firing of the tool, the fastener being mounted to the fastener guide prior to penetration of the insulation whereby penetration of the insulation by the stem occurs by manual pressure applied by an operator to the tool prior to firing of the tool to drive the pin into the substrate, the external surface of the stem including an array of fins extending generally axially of the stem to ensure uniform displacement of the insulation material during penetration.

In a preferred embodiment the stem has, outwardly of its pointed end a body portion of generally constant diameter. Preferably the body portion does have a slight concavity in an intermediate portion to reduce friction between the body portion and batt during penetration.

An embodiment of the invention will now be described by way of example only with reference to the accompanying drawings in which.

Figure 1:
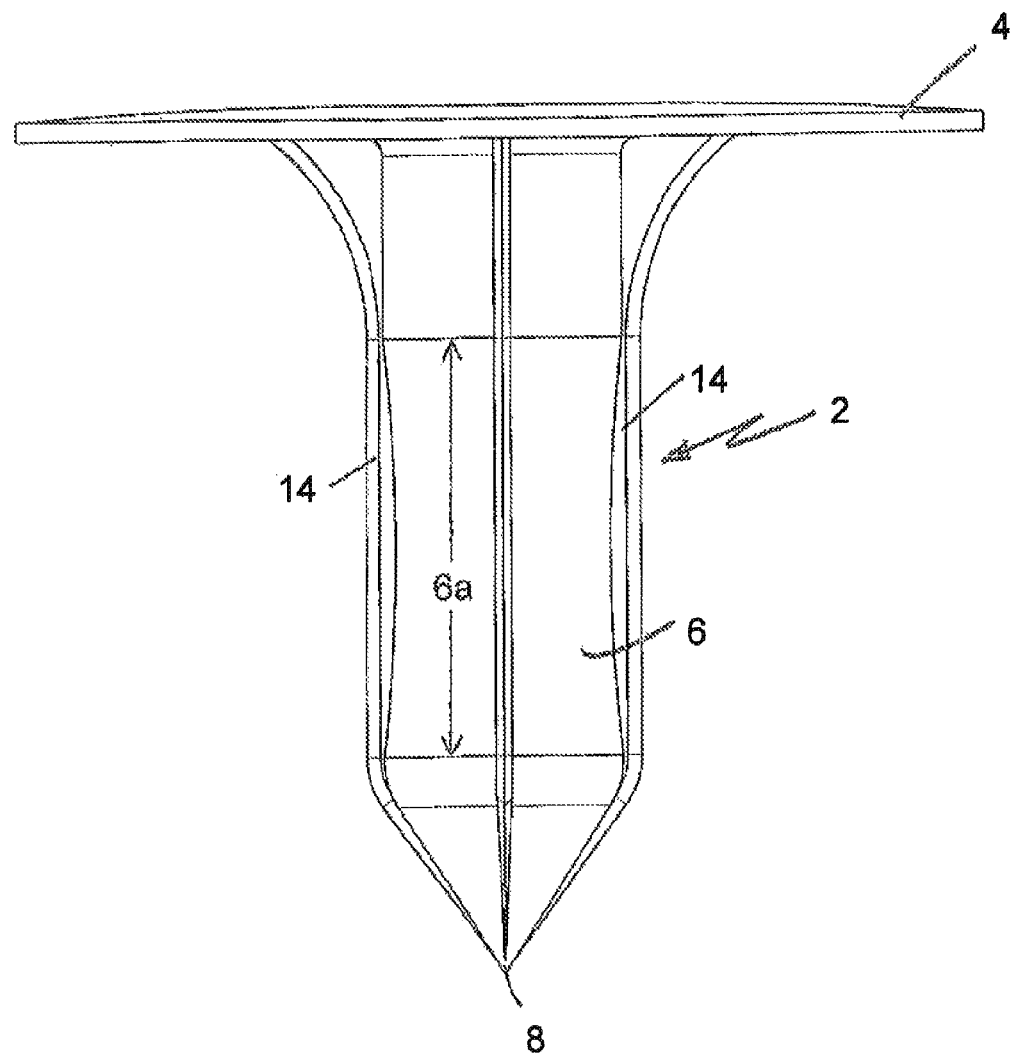
FIG. 1 is a side view of an insulation fastener in accordance with a preferred embodiment of the invention.
Figure 2:
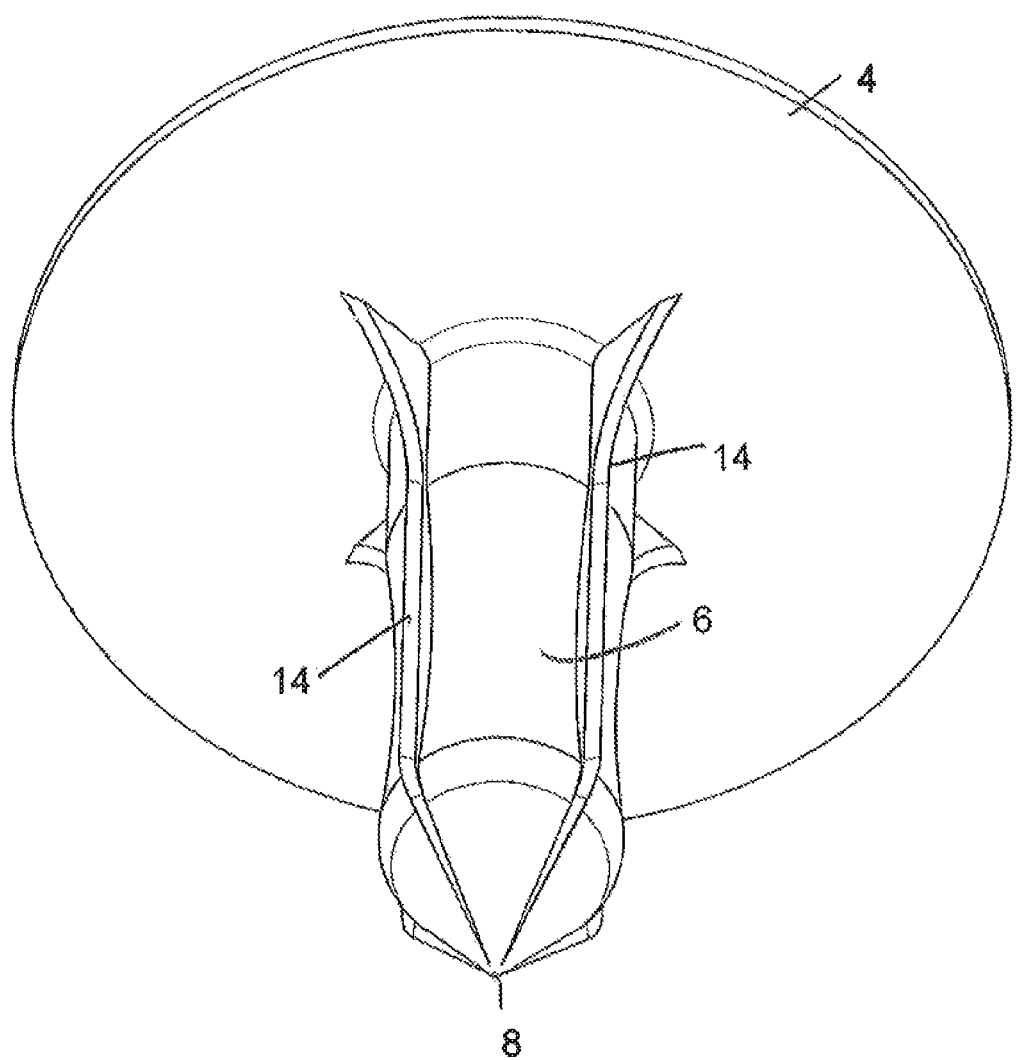
FIG. 2 is a perspective view of a fastener from underneath.
Figure 3:
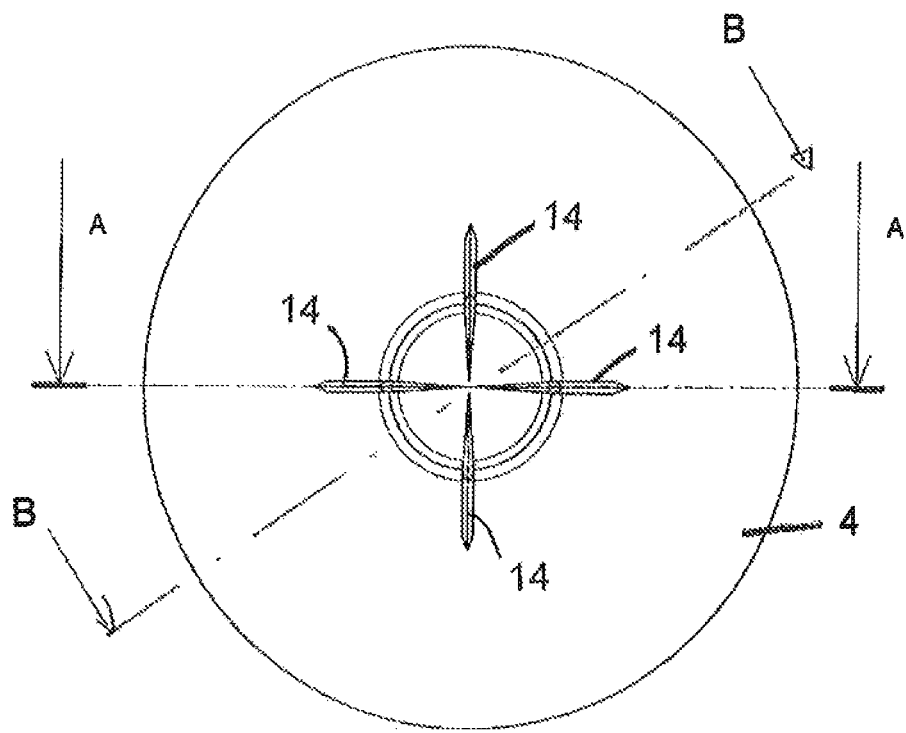
FIG. 3 is an end view of the fastener.

The fastener for thermal and/or acoustic insulation batts, panels, or cladding in accordance with the preferred embodiment of the invention comprises a body 2 formed in one piece from a moulded plastics, for example polypropylene. The body comprises at its outer end (the end adapted to lie adjacent to the exposed face of the insulation) a large area disc-like head 4 having a generally planar inner face to engage the exposed face of the insulation. A tubular stem 6 extends inwardly from the inner face of the head 4 and narrows at its inner end portion to a sharp point 8. The inner end portion of the stem 6 is configured internally to receive and retain a fastener pin 10 (shown in outline in FIG. 4). The pointed end of the pin 10 is enclosed wholly within the structure of the inner end portion of the stem 6 and lies closely adjacent to the pointed end 8 of the stem.

The fastener of the preferred embodiment is of design for use with a gas powered or air powered tool which operates by powering a driving piston along a barrel and associated fastener guide to drive a fastener pin at the end of the fastener guide. In a gas powered tool, the piston is driven by explosive combustion of a gas, for example propane and/or butane, and in an air powered tool, the piston is driven by rapid expansion of compressed air from a compressed air source. The fastener pin 10 in the fastener of the preferred embodiment is of a size sufficient to withstand the driving forces either in a gas powered or air powered tool. These forces are generally less than those generated in a conventional p.a. tool and tend to be more controllable, and therefore the pin 10 can be of reduced size/strength in relation to those employed in current insulation fasteners designed for use with p.a. tools. However the fastener may also be used with a p.a. tool modified for the purpose as will be described later.

Figure 4:
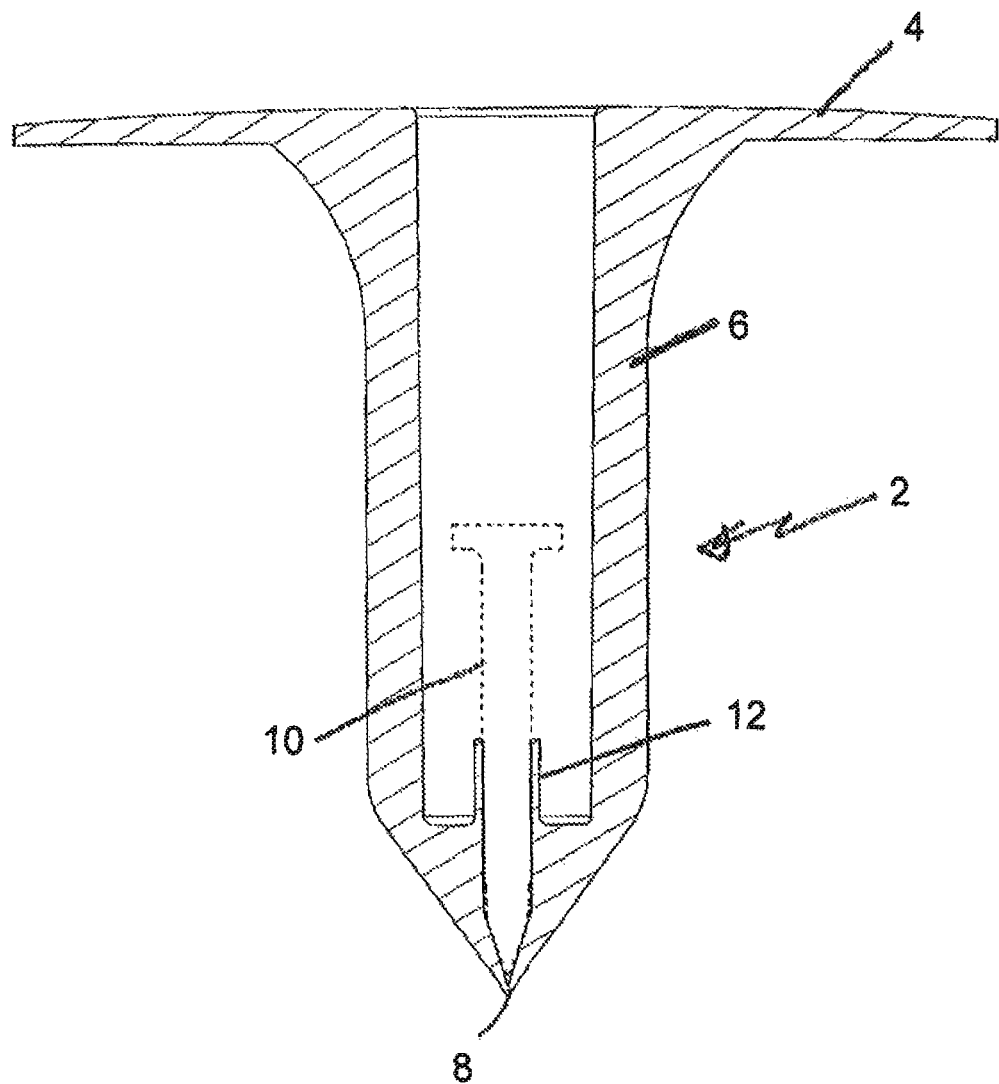
FIG. 4 is a section taken on line A-A of FIG. 3.
Figure 5:
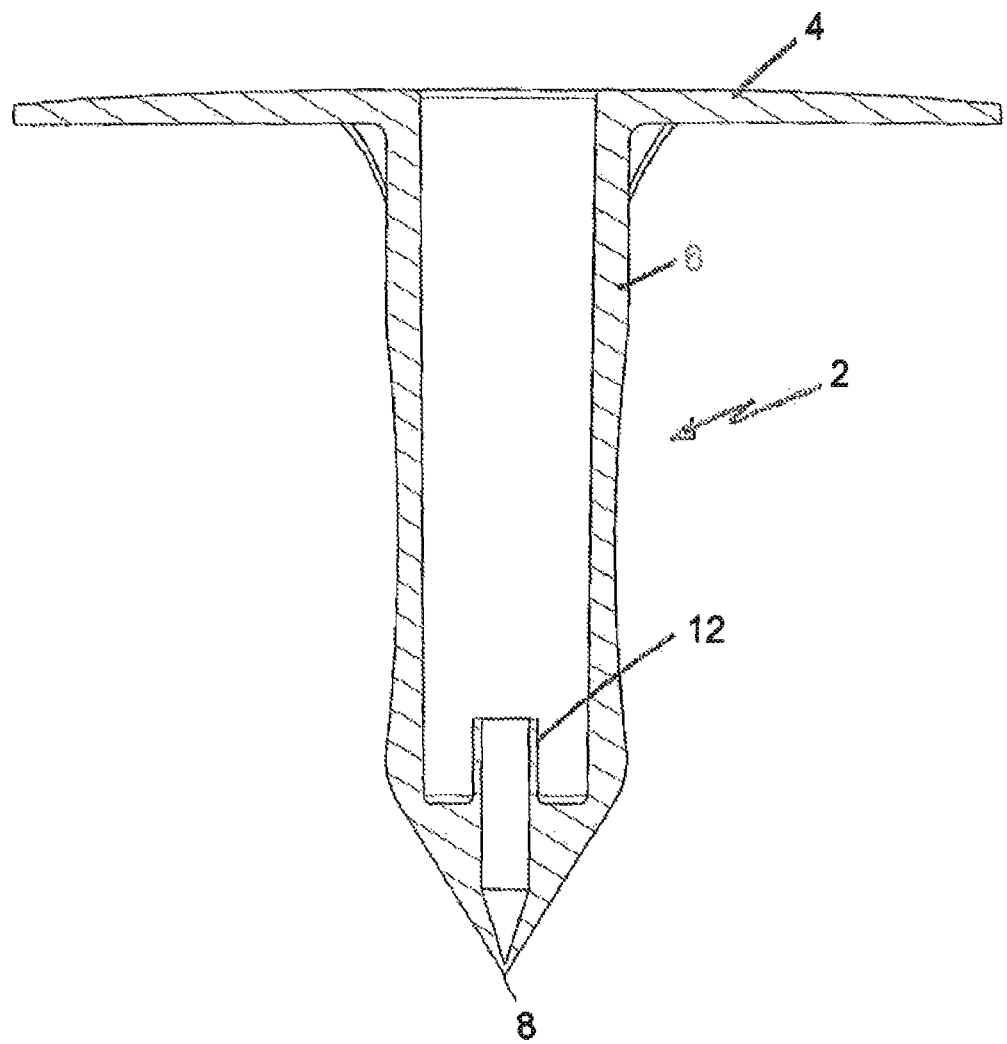
FIG. 5 is a section taken on line B-B of FIG. 3.

It will be seen from FIGS. 4 and 5 that the pointed inner end portion of the stem 6 is substantially solid apart from penetration by the passage in which the pin 10 is located to provide a thick body of plastics material. A tubular spigot 12 projects outwardly from that solid end portion and, when the pin 10 is in position within the stem 6 of the body 2, the spigot 12 lies inwardly of the head of the pin. In use, the fastener body 2 with the pin 10 fitted within the stem 6 is applied to the fastener guide of the tool by inserting the stem 6 over the front end portion of the fastener guide with the tubular spigot 12 and pin head being sized to be received within the fastener guide. To facilitate retention of the fastener body 2 to the fastener guide, the interior of the stem 6 may include an array(s) of fins, ribs, or other projections to frictionally grip the external surface of the fastener guide, or an array of flexible gripping fingers may be incorporated for that purpose within the head 4 at the entrance to the stem 6. When gripping fingers are used they will lie at the entrance to the stem and this will facilitate the subsequent application of render over the outer face of the insulation. Alternatively a closure cap can be inserted into the outer end of the stem for this purpose; such a cap may be integrally formed with head 4 to pivot into engagement in the end of the stem after removal of the applying tool. With the fastener thus applied to the tool, the stem 6 can be pushed through the insulation using manual pressure applied by the operator via the tool. The configuration of the pointed end portion of the stem ensures that it can easily be pushed through the insulation, even insulation composed of a relatively high density material. In this regard it should be noted that the inner end portion of the stem is sharply pointed and progressively widens outwardly without providing any flattened or stepped areas which could act to provide an impediment to penetration. Also the fact that the pointed end of the pin itself is fully enclosed within the closed end portion of the stem rather than projecting through the end, means there is no external transition between the pin and stem to form a surface which may impede penetration.

The external surface of the stem 6 is formed with an array of fins 14 which commence closely adjacent to the pointed end 8 and extend longitudinally along the length of the stem. The fins 14 progressively rise from zero height adjacent the pointed end 8 and over the main body of the stem 6 their radially outer edges lie on an imaginary cylindrical surface of constant diameter throughout the major part of their length (see FIGS. 1 and 4), the fins 14 widening outwardly adjacent the head 4 for reinforcement of the transition between the stem 6 and the head 4. As shown there are four such fins uniformly placed around the stem 6 but there could be less than four such fins, three for example or more than four fins, five for example. The fins 14 perform an important role in the penetration of the stem 6 into the insulation in conjunction with the pointed end 8 as they ensure that during penetration of the stem, the material of the insulation is displaced uniformly around the stem whereby the stem 6 tends to remain straight and therefore 'on line' rather than inclining as can arise from non-uniform displacement of the insulation material, particularly when the material is relatively dense.

The main body of the stem may be of constant outer diameter beyond its pointed tip portion, but it is preferred that the main body is slightly concave in an intermediate zone between its tip portion and outer end portion and this concavity is clearly visible in FIGS. 1 and 5, the concave zone being designated 6*a* in FIG. 1. The effect of concavity is to reduce the friction exerted between the stem 6 and insulation, particularly relatively dense insulation, during insertion of the stem 6. However, the slight concavity within the zone 6*a* does not impair the guidance and retention of the stem during penetration as guidance will be ensured by the presence of the fins 14 which, together with the zones of maximum diameter at either side of the zone 6*a*, will ensure retention and alignment in the insulation prior to firing of the tool.

The length of the stem 6 corresponds to the thickness of the insulation so that when the stem has been fully inserted through the insulation with its pointed tip 8 in engagement with the underlying substrate, its head 4 will be in firm contact with the outer face of the insulation. It will be understood from this that, in practice, insulation fasteners in accordance with the preferred embodiment will be produced in a range of sizes, with stems of different length corresponding to different standard thicknesses of insulation.

With the insulation fastener in position in the insulation with its stem having fully penetrated the insulation into engagement with the underlying substrate, the tool (to which the fastener is still attached) can be cocked by the operator applying further forwards pressure to displace the body of the tool relative to the fastener guide. After cocking the tool can be fired so that the pin 10 drives into the substrate so as to anchor the fastener. It is to be noted that during driving of the pin 10, its head will collapse the internal tubular spigot 12 and this will act as a shock absorbing function as firing takes place.

Although the fastener has been described in relation to the fastening of thermal and/or acoustic insulation to the underlying substrate, it can also be used for fastening other cladding, particularly in the nature of a cellular or expanded foam, which requires the fastener to penetrate through its thickness before driving the fastener pin into the substrate. It is also to be understood that the underlying substrate is not necessarily of a hard nature, such as concrete; the substrate could be of a softer material, wood for example as in a wooden wall frame.

Although it is envisaged that the insulation fastener will primarily be used with gas or air tools which are designed for use with smaller fastener pins than conventional p.a. tools, it is also possible that the fastener could be used with a p.a. tool modified to incorporate a reduced diameter fastener guide and driving piston to accommodate the smaller pins, with the output power being reduced by means of a power control and/or the use of an explosive charge of reduced power.

Advantageously the insulation fastener of the preferred embodiment is used in conjunction with a gas tool, air tool or p.a. tool which is designed so that it does not cock prematurely during the phase of operation in which the tool is being used to push the stem of the fastener through the insulation. Tools having this capability are the subject of our co-pending application entitled 'A tool for applying an insulation fastener'.

The embodiment has been described by way of example and modifications are possible within the scope of the invention.

The invention claimed is:

1. A fastener for use in fastening insulation to a substrate, comprising a fastener body having a head for engagement with an outer face of the insulation, a tubular stem extending inwardly from the head for penetration through the insulation into engagement with the substrate, the stem having a pointed tip portion remote from the head for penetration of the insulation and the stem being hollow to receive a fastening pin having a pointed end fully enclosed within the stem adjacent the tip, the interior of the stem being adapted to receive a fastener guide of a fastening tool operative to drive the pin into the substrate by means of a driving piston propelled along the fastener guide by gas pressure on firing of the tool, the fastener being mounted to the fastener guide prior to penetration of the insulation whereby penetration of the insulation by the stem occurs by manual pressure applied by an operator to the tool prior to firing of the tool to drive the pin into the substrate, the external surface of the stem including an array of fins extending generally axially of the stem to ensure uniform displacement of the insulation material during penetration.

2. A fastener according to claim 1 having, between the head and tip portion a body portion of generally constant outer diameter.

3. A fastener according to claim 2, wherein an intermediate part of the body portion has a slight concavity in its external surface to reduce friction between the body portion and insulation during penetration.

4. A fastener as claimed in claim 1, further comprising a pin, wherein the pin is fully enclosed within the stem.

5. A fastener according to claim 1, wherein a substantial length of the stem, between the head and tip portion corresponds to a body portion of generally constant outer diameter.

6. A fastener according to claim 5, wherein an intermediate part of the body portion has a slight concavity in its external surface to reduce friction between the body portion and insulation during penetration.

7. A fastener as claimed in claim 1, wherein fins of the array of fins are located proximate the head.

8. A fastener as claimed in claim 1, wherein relative to the longitudinal axis of the fastener, the fins of the array of fins extend beyond the maximum outer circumference of any part of the tubular stem.

9. A fastener according to claim 1, wherein substantially the entire length of the tubular stem, between the head and tip portion, corresponds to a body portion of generally constant outer diameter.

10. A fastener for use in fastening insulation to a substrate, comprising:

a fastener body having a head for engagement with an outer face of the insulation;

a tubular stem extending away from the head and configured to penetrate through the insulation into engagement with the substrate, the stem having a pointed tip portion remote from the head configured to penetrate the insulation, the stem being hollow and configured to receive a fastening pin having a pointed end fully enclosed within the stem adjacent the tip, the interior of the stem being adapted to receive a fastener guide of a fastening tool operative to drive the pin into the substrate by a drive piston propelled along the fastener guide on actuation of the tool, the external surface of the stem including an array of fins extending generally axially of the stem.

11. A fastener as claimed in claim 10, wherein fins of the array of fins are located proximate the head.

12. A fastener as claimed in claim 10, wherein relative to the longitudinal axis of the fastener, the fins of the array of fins extend beyond the maximum outer circumference of any part of the tubular stem.

13. A fastener according to claim 10, wherein substantially the entire length of the tubular stem, between the head and tip portion, corresponds to a body portion of generally constant outer diameter.

14. A device for use in fastening insulation to a substrate, comprising:

a fastening pin having a pointed end; and a fastener body having a head for engagement with an outer face of the insulation, the fastener body including a tubular stem extending away from the head and configured to penetrate through the insulation into engagement with the substrate, the stem having a pointed tip portion remote from the head configured to penetrate the insulation, the stem being hollow and holding therein the fastening pin such that the fastening pin's pointed end is fully enclosed within the stem at a location immediately proximate the tip, the external surface of the stem including an array of fins extending generally axially of the stem.

15. A device according to claim 14, wherein a substantial length of the stem, between the head and tip portion corresponds to a body portion of generally constant outer diameter.

16. A device according to claim 15, wherein an intermediate part of the body portion has a slight concavity in its external surface to reduce friction between the body portion and insulation during penetration.

17. A fastener as claimed in claim 14, wherein a substantial length of the pin encompasses a smooth cylindrical body.

18. A fastener as claimed in claim 14, wherein the fastening pin and the fastening body have a configuration that is generally the same.

19. A device as claimed in claim 14, wherein fins of the array of fins are located proximate the head.

20. A device as claimed in claim 14, wherein relative to the longitudinal axis of the fastener body, the fins of the array of fins extend beyond the maximum outer circumference of any part of the tubular stem.

21. A device according to claim 14, wherein substantially the entire length of the tubular stem, between the head and tip portion, corresponds to a body portion of generally constant outer diameter.

* * * * *